United States Patent
Leung et al.

(10) Patent No.: US 7,342,988 B2
(45) Date of Patent: Mar. 11, 2008

(54) NEUTRON TUBES

(75) Inventors: Ka-Ngo Leung, Hercules, CA (US); Tak Pui Lou, Berkeley, CA (US); Jani Reijonen, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/360,245

(22) Filed: Feb. 6, 2003

(65) Prior Publication Data

US 2003/0234355 A1 Dec. 25, 2003

Related U.S. Application Data

(60) Provisional application No. 60/355,576, filed on Feb. 6, 2002, provisional application No. 60/356,350, filed on Feb. 13, 2002.

(51) Int. Cl.
*G21B 1/00* (2006.01)
(52) U.S. Cl. .................... 376/108; 376/114; 376/116
(58) Field of Classification Search ................ 376/108, 376/109, 114–117
See application file for complete search history.

(56) References Cited

U.S. PATENT DOCUMENTS

| | | | | | |
|---|---|---|---|---|---|
| 2,251,190 | A | * | 7/1941 | Kallmann | .................. 376/109 |
| 2,287,619 | A | * | 6/1942 | Kallmann et al. | .......... 376/115 |
| 2,998,523 | A | * | 8/1961 | Muench et al. | ............. 376/116 |
| 3,117,230 | A | * | 1/1964 | Yule | ............................ 376/111 |
| 3,246,191 | A | * | 4/1966 | Frentrop | .................... 376/109 |
| 3,265,896 | A | * | 8/1966 | Redstone et al. | ........... 376/109 |
| 3,302,026 | A | * | 1/1967 | Mallon et al. | .............. 376/116 |
| 3,417,245 | A | * | 12/1968 | Schmidt | ..................... 376/115 |
| 3,448,314 | A | * | 6/1969 | Bounden et al. | ............ 376/116 |

(Continued)

FOREIGN PATENT DOCUMENTS

JP 0035080 * 7/1987 ................. 376/115

(Continued)

OTHER PUBLICATIONS

"Controlled Thermonuclear Reactions—An Introduction to Theory and Experiment", by Glasstone et al, Robert E- Krieger Pub. Co., Huntington, New York, (1975), pp. 13-15.*

(Continued)

*Primary Examiner*—Ricardo J. Palabrica
(74) *Attorney, Agent, or Firm*—Fulbright & Jaworski LLP

(57) ABSTRACT

A neutron tube or generator is based on a RF driven plasma ion source having a quartz or other chamber surrounded by an external RF antenna. A deuterium or mixed deuterium/tritium (or even just a tritium) plasma is generated in the chamber and D or D/T (or T) ions are extracted from the plasma. A neutron generating target is positioned so that the ion beam is incident thereon and loads the target. Incident ions cause D-D or D-T (or T-T) reactions which generate neutrons. Various embodiments differ primarily in size of the chamber and position and shape of the neutron generating target. Some neutron generators are small enough for implantation in the body. The target may be at the end of a catheter-like drift tube. The target may have a tapered or conical surface to increase target surface area.

8 Claims, 4 Drawing Sheets

U.S. PATENT DOCUMENTS

| | | | | |
|---|---|---|---|---|
| 3,581,093 | A | * | 5/1971 | Carr .......................... 250/84.5 |
| 3,629,588 | A | * | 12/1971 | Eyrich ....................... 250/84.5 |
| 3,664,960 | A | * | 5/1972 | David et al. ................ 376/114 |
| 3,786,258 | A | * | 1/1974 | Schmidt ..................... 376/115 |
| 5,215,703 | A | * | 6/1993 | Bernardet ................... 376/114 |
| 5,745,536 | A | * | 4/1998 | Brainard et al. ............. 376/108 |
| 6,141,395 | A | * | 10/2000 | Nishimura et al. ......... 376/108 |
| 6,297,507 | B1 | * | 10/2001 | Chen et al. ............. 250/370.11 |
| 6,352,500 | B1 | * | 3/2002 | Halpern ........................ 600/3 |
| 2002/0131543 | A1 | * | 9/2002 | Leung ........................ 376/108 |

OTHER PUBLICATIONS

"The Random House College Dictionary", (1980), by Random House, Inc., p. 704.*

Lomer, P.D.;Bounden, J.E.;Wood, J.D.L.H., "High Output Neutron Generating Tubes," CONF-650405-2. Services Electronics Rsrch Lab (Baldock, England), p. 623-634, (Sep. 1, 1964).

Eyrich, W.; Schmidt, A.; "Two Compact, High-Intensity Pulsed Neutron Sources," Tehnical Report No. KFK-304; SM-62/4; SM-62/4, Federal Republic of Germany (Germany), (May 1, 1965), pp. 589, 591, 598-608.

Lomer, P.D.;Bounden, J.E.; Wood, J.D.L.H., "A Neutron Tube with Constant Output," Nucl. Instr. Methods, Services Electronics Resrch Lab (Baldock, England), p. 283-288, (Mar. 1, 1965).

Perkins, et al. "A Compact, RF-Driven, Pulsed ION Source For Intense Neutron Generation," IEEE, 1998, pp. 2761-2763.

Reijonen, et al. "Compact Neutron Source Development At LBNL, eScholarship Repository," 2001 (8 pages).

Burcham, W.E., "Nuclear Physics/An Introduction," McGrow-Hill Book Co., 1963, pp. 352-353.

"Webster's Encyclopedic Unabridged Dictionary of the English Language," Grammercy Books, NY, 1989, pp. 394, 1473, 1516.

"Webster's New World Dictionary of Mathematics," MacMillan, 1989, p. 180.

* cited by examiner

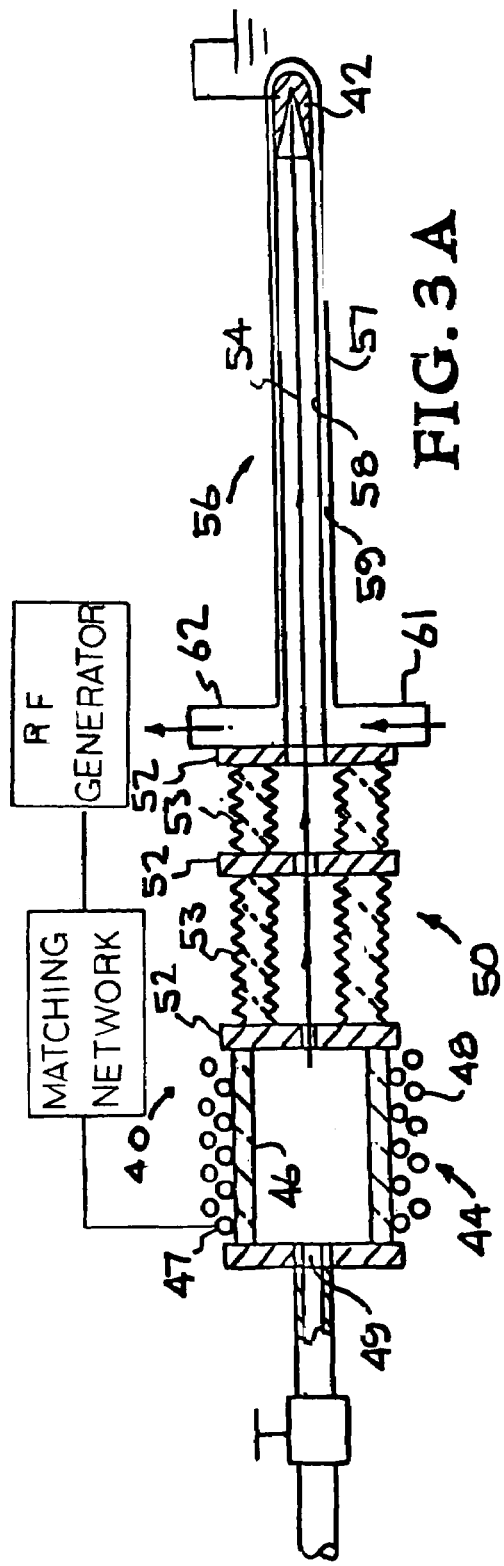
FIG.3A
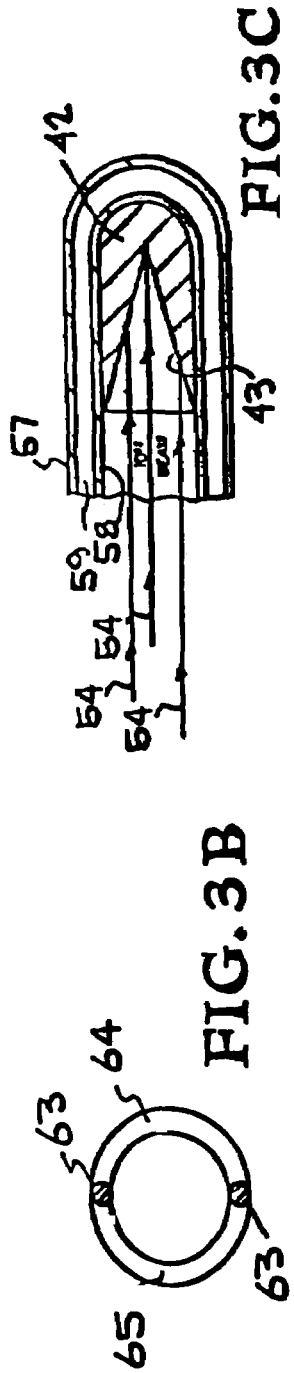
FIG.3C
FIG.3B
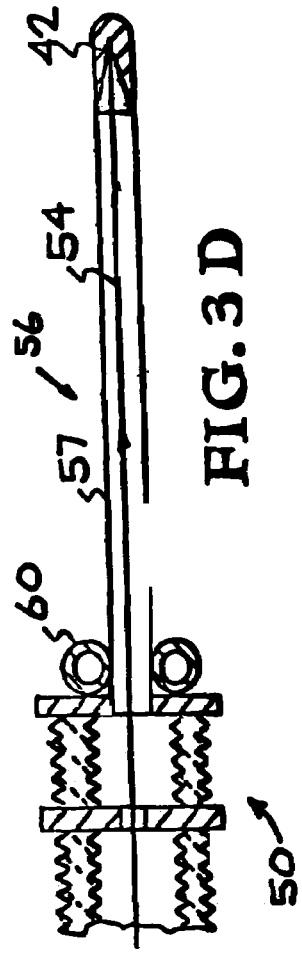
FIG.3D

NEUTRON TUBES

RELATED APPLICATIONS

This application claims priority of Provisional Applications Ser. Nos. 60/355,576 filed Feb. 6, 2002 and 60/356,350 filed Feb. 13, 2002, which are herein incorporated by reference.

GOVERNMENT RIGHTS

The United States Government has rights in this invention pursuant to Contract No. DE-AC03-76SF00098 between the United States Department of Energy and the University of California.

BACKGROUND OF THE INVENTION

The invention relates generally to neutron tubes, and more specifically to neutron tubes based on plasma ion sources.

Conventional neutron tubes employ a Penning ion source and a single gap extractor. The target is a deuterium or tritium chemical embedded in a molybdenum or tungsten substrate. Neutron yield is limited by the ion source performance and beam size. The production of neutrons is limited by the beam current and power deposition on the target. In the conventional neutron tube, the extraction aperture and the target are limited to small areas, and so is the neutron output flux.

Commercial neutron tubes have used the impact of deuterium on tritium (D-T) for neutron production. The deuterium-on-deuterium (D-D) reaction, with a cross section for production a hundred times lower, has not been able to provide the necessary neutron flux. It would be highly desirable and advantageous to make D-D neutron sources. This will greatly increase the lifetime of the neutron generator, and it would greatly reduce transport and operational safety concerns.

Brachytherapy is a type of radiation therapy in which radioactive materials are placed in direct contact with the tissue being treated. The currently available fast neutron source for brachytherapy treatment of tumors is a spontaneous fission source such as the radioactive isotope Cf-252 which is implanted into a patient. All present U.S. Cf-252 neutron source designs require manually afterloaded systems. Because Cf-252 is a radioactive source, it cannot be turned off to prevent excessive exposure of clinical personnel. The average energy of the spontaneous neutrons emitted from a Cf-252 source is 2.3 MeV which is very close to the energy of a D-D neutron source, 2.45 MeV. By utilizing a D-D neutron tube which can be turned on and off, the patient can be subjected to radiation treatment at desired times, and clinical personnel will receive no occupational dose from the source while it is turned off during patient preparation.

The utilization of in-situ fast neutrons in treating radioresistant tumors has been demonstrated to be more effective than external neutron sources where the neutrons have been slowed down while penetrating the body. Since the dose is delivered to the tumor by fast neutrons, it is not necessary to inject any drug for the delivery of neutron absorbing boron into the tumor, as is often done to increase the capture of slow neutrons. However, boron can be used to enhance the dose delivery to neighboring metastases. Therefore, another advantage of a fast neutron brachytherapy source over an external source is its capability of tailoring the dose distribution around the region of the tumor.

Therefore, a miniaturized implantable neutron generator design adapted for brachytherapy would be highly advantageous.

It would also be desirable, in many other applications such as cargo screening, airport luggage screening, and explosives detection, to have a sealed tube neutron generator which provides a high neutron flux with long life operation and with variable source size. The neutron generator would overcome many of the shortcomings of the presently available neutron tubes.

SUMMARY OF THE INVENTION

The invention is a generic class of neutron tubes or generators based on a RF driven plasma ion source having a quartz or other chamber surrounded by an external RF antenna. A deuterium or mixed deuterium/tritium (or even just a tritium) plasma is generated in the chamber and D or D/T (or T) ions are extracted from the plasma. A neutron generating target is positioned so that the ion beam is incident thereon and loads the target. Incident ions cause D-D or D-T (or T-T) reactions which generate neutrons. The invention may be implemented in numerous embodiments. The general principles and features are the same for all embodiments which differ primarily in size of the chamber and position and shape of the neutron generating target.

The invention includes a miniaturized implantable neutron generator or tube that produces fast neutrons from a D-D reaction which can be used for brachytherapy applications. The tube is formed of a small RF-driven deuterium ion plasma ion source and a nearby target to which the ions are accelerated.

This embodiment provides a small size D-D neutron generator, typically less than 8 mm in diameter and 2 cm in length, which allows the source to be put right into a tumor. Absorbed dose is delivered by fast neutrons rather than thermal neutrons. The targeted tumor size is less than 5 cm in diameter. The dose delivered to the healthy tissue outside the tumor is expected to be less than other approaches utilizing an external neutron source. Unlike other brachytherapy approaches such as Cf-252, there will be zero occupational dose for clinical personnel.

The invention also includes another miniaturized neutron generator or tube that produces fast neutrons from a D-D reaction which can be used for brachytherapy applications. The tube is again formed of a small RF-driven deuterium ion plasma ion source and has a target to which the ions are accelerated. However, in this embodiment, the target is at the end of a small diameter drift tube, which can be inserted into the body like a catheter. The target also has a tapered or conical shape so that greater surface area is provided for higher neutron flux and lower energy loading.

The invention includes another embodiment of the neutron generator in which the RF driven ion source is substantially larger in size than the first two embodiments since it is not designed for implantation in the human body. The ion source has a chamber with external RF antenna in which a deuterium tritium, or mixed deuterium/tritium ion plasma is produced. The ions are extracted through a large aperture, typically subdivided into a plurality of small apertures, and accelerated to a neutron generating target which has a tapered or conical target surface. The length of the target surface provides a large neutron generating area to produce a high flux and reduces beam deposition power density.

BRIEF DESCRIPTION OF THE DRAWINGS

FIGS. 3A-D are cross-sectional views of another mini-neutron-tube of the invention.

DETAILED DESCRIPTION OF THE INVENTION

Figure 1:
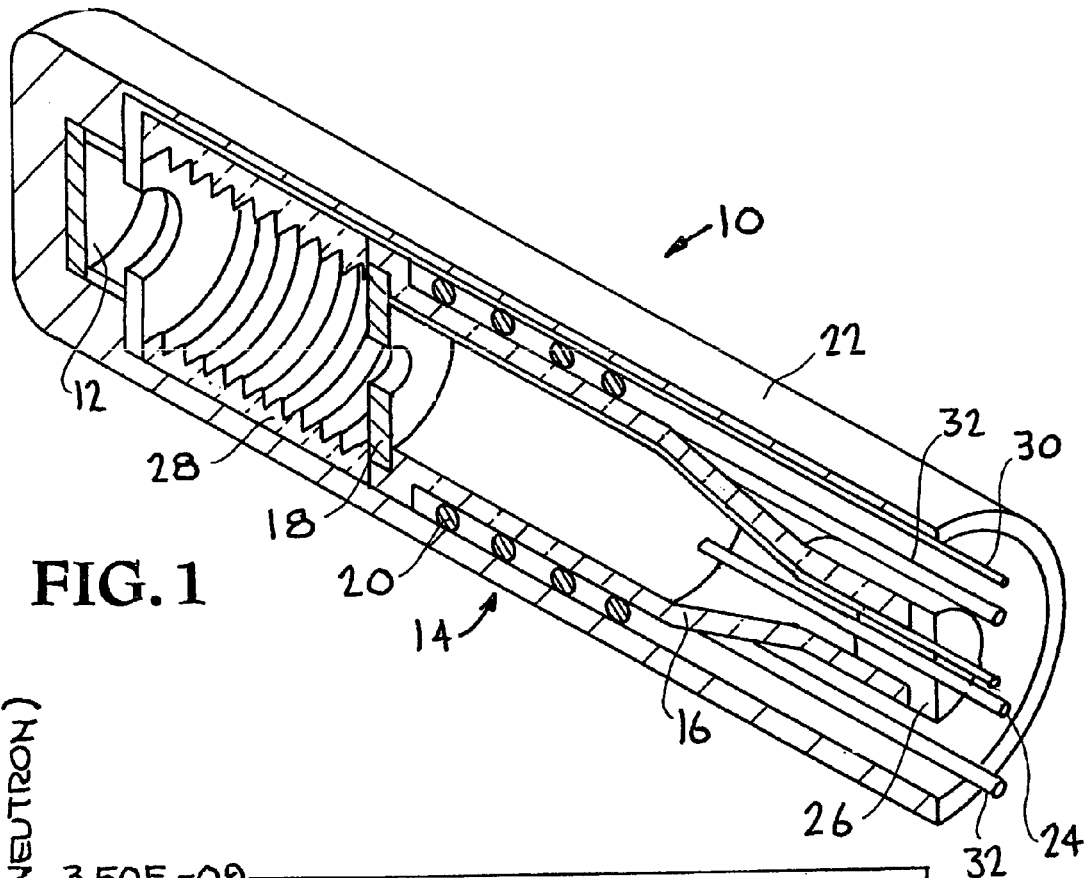
FIG. 1 is a perspective view, partly in section, of a mini-neutron-tube of the invention.

FIG. 1 shows a miniaturized implantable neutron generator or "mini-neutron-tube" 10 of the invention, which has a small neutron generating target (electrode) 12 closely spaced apart from a small plasma ion source 14. Plasma ion source 14 is formed of a quartz (or other material) plasma chamber 16. Ion source 14 and target 12 are mounted in neutron generator housing 22.

The general principles of plasma ion sources are well known in the art. Ion source 14 includes an RF antenna (induction coil) 20 surrounding (outside) plasma chamber 16 for producing an ion plasma from a gas, typically deuterium, which is introduced into chamber 16 through an inlet 24 which passes through a vacuum plug 26 at an inlet end of chamber 16. Antenna 20 is connected to an external RF power source (not shown) through conductors 32 which pass through the end of generator housing 22. For neutron generation for brachytherapy applications, the plasma produced in ion source 14 is preferably a deuterium ion plasma.

Ion source 14 also includes extraction electrode 18 at its outlet end. Electrode 18 electrostatically controls the passage of ions from the plasma out of plasma chamber 16.

Spaced apart from ion source 14, and separated therefrom by a high voltage insulator 28, is target 12. Target 12 is the neutron generating element. Ions from plasma source 14 pass through electrode 18 and impinge on target 12, typically with energy of 80 keV, producing neutrons as the result of ion induced reactions. The target 12 is loaded with D atoms by the beam. Titanium is not required, but is preferred for target 12 since it improves the absorption of these atoms.

In operation, target 12 is biased negatively, e.g. —80 kV, with respect to the extraction electrode 18, which is at ground potential. The bias voltage is applied to target 12 by high voltage line 30 which extends out of housing 22 to an external high voltage source (not shown). High voltage insulator 28 allows a high voltage to be placed between target 12 and extraction electrode 18 even though they are spaced apart by a short distance.

The neutron source in its preferred embodiments is a tube that is typically less than 8 mm in diameter and 2 cm in length. It can deliver $10^7$ n/s operating at a voltage of 80 kV and a beam current of 100 microamps. The source has a very simple design. The plasma is generated by RF induction discharge with the antenna located outside the source chamber. Very low RF power, typically less than 30 W, will be employed in the operation of the plasma source. The source and plasma electrode are biased at ground potential while the target is at a high negative potential, typically about 80 kV. The deuterium ions will be extracted from a small, typically 1 mm diameter, aperture in the plasma electrode, and will be accelerated to the Ti target at 80 kV. Deuterium atoms will be loaded on the target surface by the beam ions and neutrons will be produced by D-D reactions.

Figure 2:
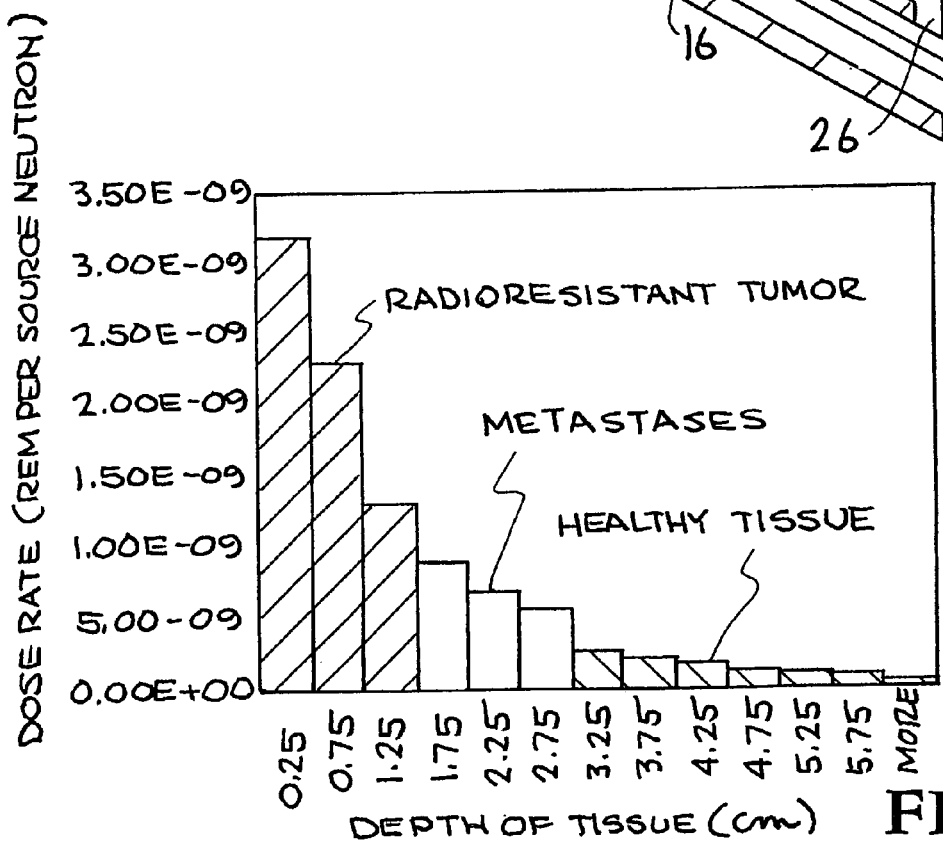
FIG. 2 is a graph of dose equivalent rate vs. tissue depth for fast neutrons.

Because of the small tube size, sufficient neutron flux produced, and fast neutron energy generated (2.45 MeV from D-D reactions) in this neutron generator, the mini-neutron-tube is well adapted for brachytherapy applications. The neutrons produced will go out from the end of the neutron generator in virtually all directions so that all parts of a surrounding tumor are irradiated. FIG. 2 shows the dose equivalent rate vs. tissue depth for the source. As can be seen, most of the neutron dose is delivered to the tumor itself or the surrounding area of metastases. Very little of the neutron dose is delivered to the healthy tissue around the tumor.

FIGS. 3A-D show a miniaturized implantable neutron generator or "mini-neutron-tube" 40 of the invention, which has a small neutron generating target (electrode) 42 spaced apart from a small plasma ion source 44. Plasma ion source 44 is formed of a quartz (or other material) plasma chamber 46, and is similar to plasma chamber 16 shown in FIG. 1. The RF plasma source 44 typically has an outer diameter of about 2 cm and is about 2.5 cm in length. Chamber 46 is preferably made of quartz and is surrounded with a coil or antenna 47, typically made of copper. Antenna 47 is connected to an RF source, e.g. a 13.5 MHz RF generator, through an impedance matching network (as in FIG. 5). On top of RF antenna coil 47 is another coil 48, typically made of copper, which is connected to a DC power supply. DC current passes through this outer coil to produce a solenoid B-field for plasma confinement within chamber 46. The presence of this B-field can lower the operating pressure within chamber 46 substantially.

Chamber 46 is filled with gas through inlet 49. Chamber 46 is filled with deuterium gas to produce $D^+$ ions for D-D neutron production, or a mixture of 50% deuterium and 50% tritium to produce $D^+$ and $T^+$ ions for D-T neutron production.

The $D^+$ or $D^+$ and $T^+$ ions produced in the ion source chamber 46 are then extracted and accelerated by extraction and accelerator column 50 which is formed of a plurality of spaced electrodes 52 separated by insulators 53. The first or extraction electrode 52 has a small hole, e.g. 1 mm diameter, for extraction of the ions, and the additional electrodes 52 have aligned apertures. The ions are accelerated to about 100 kV in a short distance, typically about 3 cm. Extraction and acceleration of the beam 54 is generally achieved using either a single gap or double gap accelerator column.

The accelerated beam 54 then enters a long narrow drift tube 56 with a typical diameter less than about 5 mm and a typical length of about 10 cm. A cone shaped neutron generating target 42, preferably made of titanium is mounted in the end of drift tube 56. Drift tube 56 may be formed of spaced concentric outer tubing 57 and inner tubing 58, which define a coolant flow channel 59 therebetween. Water or other coolant is flowed into coolant channel 59 through inlet 61 and removed through outlet 62. As shown in FIG. 3B, a pair of spacers 63 divide the channel 59 into an inlet channel 64 and outlet channel 65 so that coolant can be flowed along the length of the drift tube 56. FIG. 3C shows the details of the tip of drift tube 56 with the target 42 mounted therein, with the coolant channel 59 passing around the tip. FIG. 3D shows an alternate single tube structure for drift tube 56, in which cooling is done by a cooling channel 60 at the junction of drift tube 56 with the acceleration column 50.

Target 42 has a cone shaped surface 43 which receives the ion beam 54 and becomes loaded with deuterium or a mixture of deuterium and tritium. Ion beam 54 is sufficiently nondiverging so that the beam strikes target 54 without substantial loss of ions from the drift tube 56. The conical surface 43 of target 42 provides larger surface area for capturing the incident ions. Neutrons are produced on the target surface by D-D or D-T fusion reactions. If the beam current is 1 mA, the D-D neutron flux will be $10^8$ n/s and the D-T neutron flux will be $10^{10}$ n/s.

Figure 4A:
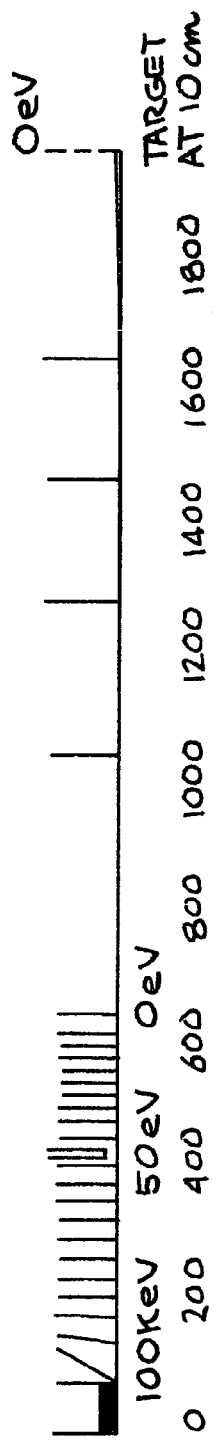
FIGS. 4A, B are ion optics computation results using the IGUN simulation code for double or single gap accelerators.
Figure 4B:
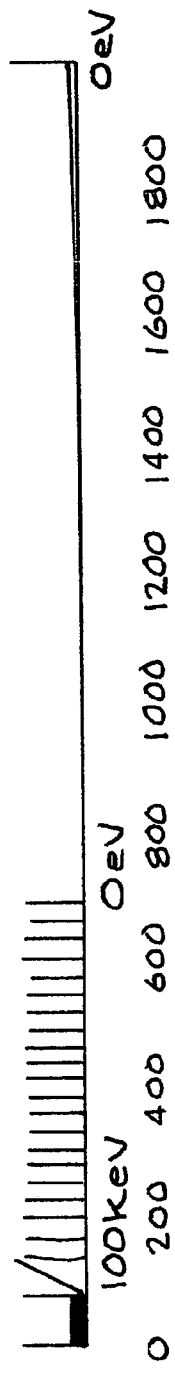

FIGS. 4A, B are ion optics computation results using the IGUN simulation code for double or single gap accelerators. The results show that the ion beam can propagate into the target without impinging on the inner wall of the drift tube. The beam spreads to about 2 mm diameter when it arrives at the cone shaped target and the power density is much reduced. The heat load of about 100 W on the target will be removed by circulating water. Either of the two water cooling schemes shown above can be used, i.e. the double layer tubing arrangement of FIGS. 3A-C or the edge cooling arrangement of FIG. 3D.

The neutron generator 40 is well suited for brachytherapy since the tip of drift tube 56 with neutron generating target 42 can be inserted in direct contact with the tissues being treated by inserting the tube 56 as a catheter. The neutron source can be readily turned on and off as needed to deliver the desired dosage by simply turning the ion source 44 on and off by applying suitable pulses of RF to antenna 47. The Ti target 42 and drift tube 56 are biased at ground potential while the plasma source 44 (or the first electrode 52 of acceleration column 50) is biased at +100 kV relative to ground. The plasma source and accelerator column are both shielded with a grounded casing (not shown). Thus the part of the instrument in contact with the patient is always at ground potential and therefore will Post no high voltage danger during therapy treatment.

Figure 5:
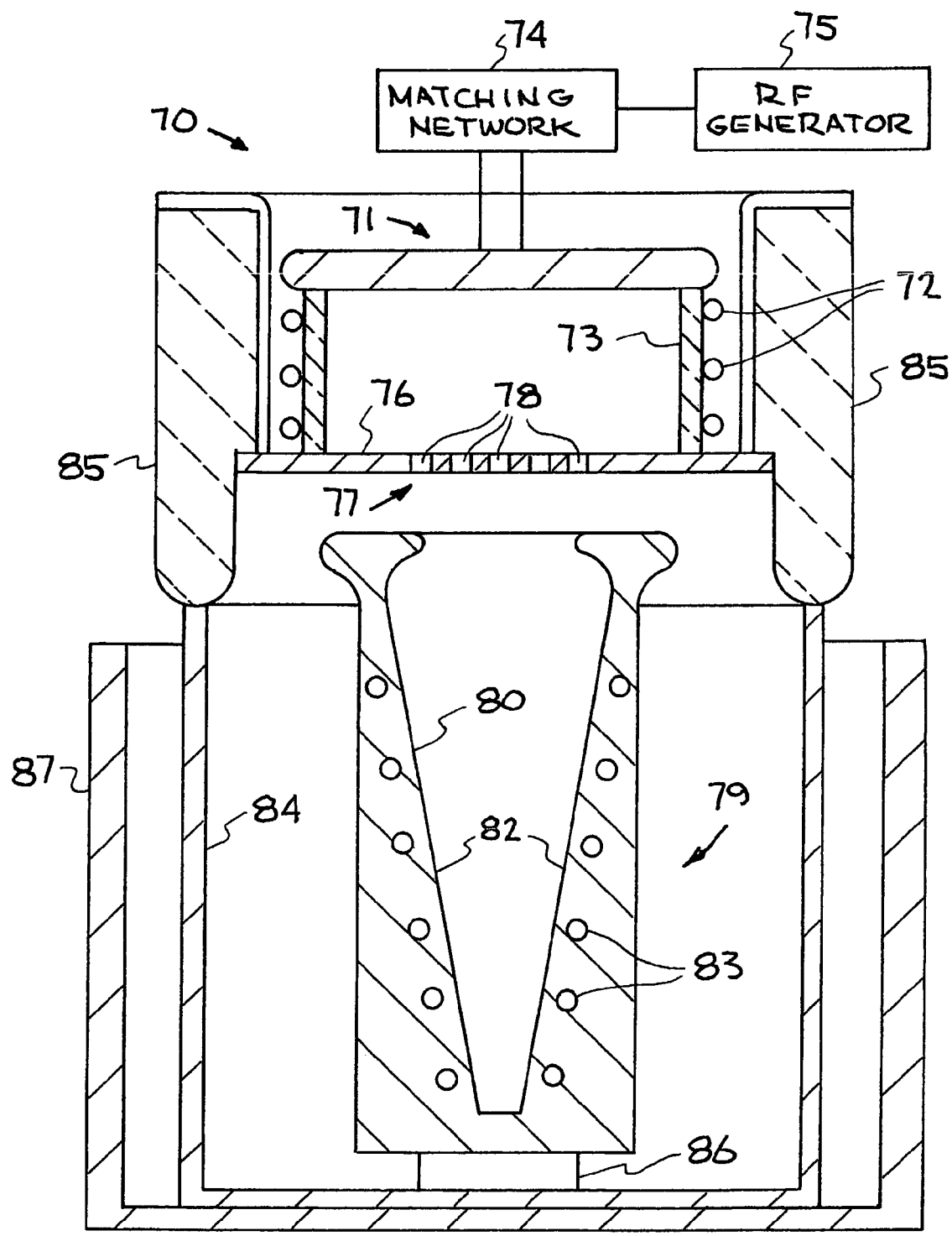
FIG. 5 is a cross-sectional view of another neutron-tube of the invention.

FIG. 5 illustrates another sealed tube neutron generator 70 of the invention that is based on a RF driven plasma ion source 71 with external antenna 72. Ion source 71 is formed of a quartz (or other suitable material, e.g. ceramic) chamber 73 with antenna (coil) 72 wound externally thereon. Antenna 72 is connected through matching network 74 to RF generator 75 for producing a plasma in chamber 73. While ion sources 10, 40 previously described are generally miniaturized because of their medical applications, ion source 71 may be of any size, depending on the application, e.g. about 10 cm diameter; however, the principles of operation are similar.

For neutron generation, the plasma is a deuterium or deuterium and tritium (or even just tritium) plasma. The ion source can be operated at several mTorr of deuterium or tritium or a mixture thereof. The low pressure operation enables the design of the accelerator column for high voltage (e.g. 120 kV) standoff.

Ions from plasma chamber 73 are extracted through plasma electrode 76, which has a large aperture 77 (e.g. >3 cm diameter) which is subdivided into a plurality of smaller apertures 78 (e.g. 2 mm diameter). This multi-beamlet design provides large extraction area with high current density, e.g. 100 mA/cm$^2$ or higher) and high atomic ion species (e.g. >90%).

Figure 6:
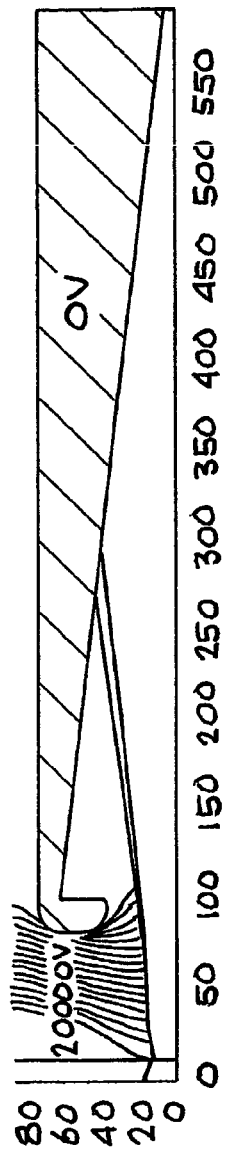
FIG. 6 shows a calculated ion beam distribution along a target surface for the neutron tube of FIG. 5.

The accelerator column 79 is a single gap column with the neutron generating target 80 forms the second or extraction electrode. Neutron generating target 80 has a conical or tapered inner surface 82 oriented along the beam axis to provide a large target area for the ion beam. FIG. 6 shows a calculated ion beam distribution along a target surface.

Target 80 is preferably made of titanium and becomes loaded with deuterium and/or tritium so that neutrons are generated by D-D or D-t (or even T-T) reactions. The length and slope of the conical surface 82 can be tailored to minimize the beam deposition power density. Cooling channels 83 can also be included in target 80 for removing heat. Since the length of the target 80 can be extended, generator 70 can provide a line source of neutrons.

The ion source 71 can be operated at high voltage and the target 80 at ground potential, e.g. plasma chamber 73 and plasma electrode 76 are shown connected to a high voltage supply (H.V.). Target 80 is enclosed in a metal housing 84, and connected thereto by mount 86. Housing 84 is separated from HV by insulator 85, and is preferably grounded. Alternatively the ion source can be grounded and target 80 at high voltage. Housing 84 can also be surrounded by shield 87.

This embodiment of the invention can produce D-D neutron flux higher than $10^{11}$ n/s with modest length and diameter. D-T neutron output is about two orders of magnitude higher. This neutron generator can form a line source with low beam power density and high neutron flux. This configuration has particular application for cargo or luggage screening and for reactor start-up.

Changes and modifications in the specifically described embodiments can be carried out without departing from the scope of the invention which is intended to be limited only by the scope of the appended claims.

The invention claimed is:

1. A neutron generator including an electrical ground connected to a neutron generating target, said neutron generator comprising:
   a plasma chamber disposed in a plasma ion source, and an external RF antenna disposed outside and around said plasma chamber;
   an extraction and acceleration system including three electrodes, a first electrode having a centered aperture being disposed at an end of said plasma chamber for extracting an ion beam, a second electrode having a centered aperture being disposed a distance from said first electrode that is between said first electrode and a neutron generating target positioned outside plasma chamber, and a third electrode having a centered aperture being disposed a distance from the second electrode that is between said second electrode and said neutron generating target, all three apertures aligned for extracting the ion beam, the ion beam being a deuterium ion beam, from the plasma chamber;
   said neutron generating target electrically connected to ground, said neutron generating target including a tapered conical concave surface having an apex, the concave surface having a target surface area into which ions in the ion beam impact, the concave target surface area being shaped and disposed so that the ions impact the target surface area at angles from normal to the target surface area that are greater than zero degrees, and said neutron generating target disposed outside and away from said plasma chamber and positioned so that the extracted ion beam is incident thereon to load the target and generate neutrons by reactions.

2. The neutron generator of claim 1 wherein the acceleration system accelerates the ions to an energy of the order of about 100 keV.

3. The neutron generator of claim 1 wherein the plasma ion source chamber is made of quartz or ceramic.

4. The neutron generator of claim 1 wherein the target is separated from the ion source by a drift tube.

5. The neutron generator of claim 4 wherein the ion source has a diameter of about 2 cm or less and a length of about 2.5 cm or less, and the drift tube has a diameter of about 5 mm or less and a length on the order of about 10 cm.

6. The neutron generator of claim 4 wherein the drift tube has a cooling channel.

7. The neutron generator of claim 1 further comprising an RF generator and a matching network through which the RF antenna is connected to the RF generator.

8. The neutron generator of claim 1 further comprising a plasma confinement solenoid surrounding the RF antenna.

* * * * *